April 11, 1967 R. M. VOITIK ET AL 3,313,551
ROTARY SEAL
Filed June 24, 1963
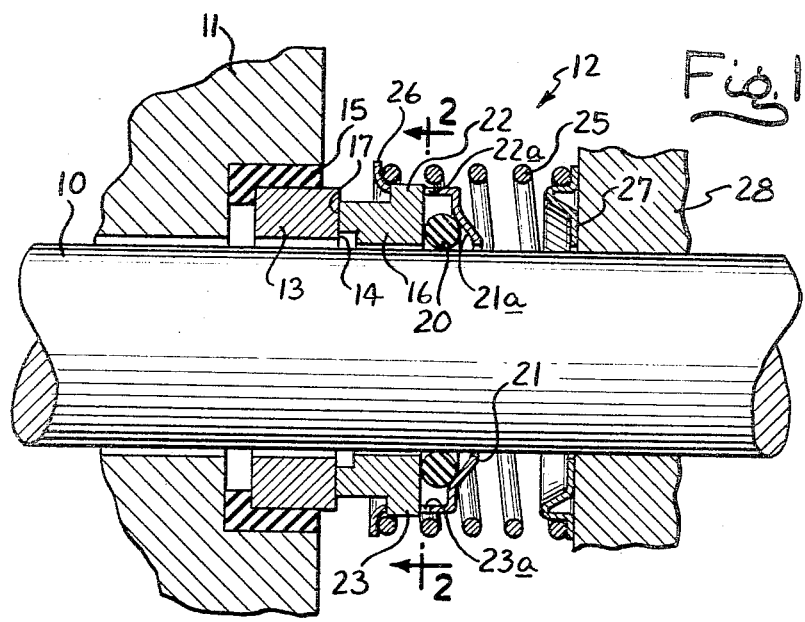
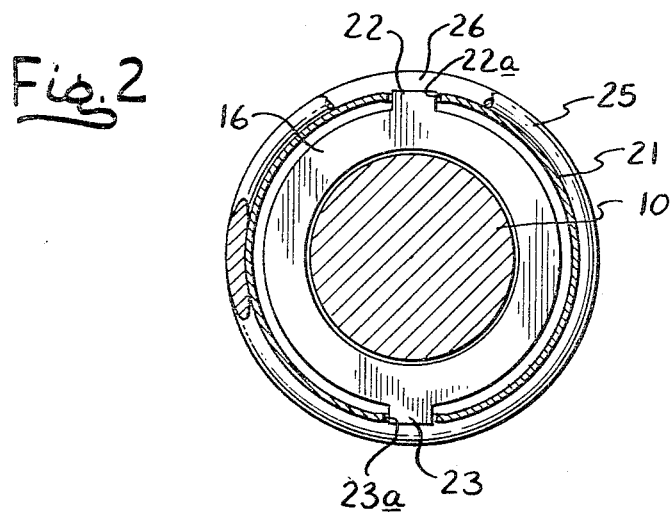
INVENTORS
ROBERT M. VOITIK
KERMIT D. YOST
BY
Wolfe, Hubbard, Voit & Osann
ATTYS.

United States Patent Office 3,313,551
Patented Apr. 11, 1967

3,313,551
ROTARY SEAL
Robert M. Voitik, Evanston, and Kermit D. Yost, Skokie, Ill., assignors to Continental Illinois National Bank and Trust Company of Chicago as trustee
Filed June 24, 1963, Ser. No. 290,034
1 Claim. (Cl. 277—87)

The present invention relates to rotary seals and more specifically to an improved secondary rotary face seal.

A primary object of the present invention is to provide an improved rotary face seal for fluid pumps or the like which is more economical to manufacture and maintain than prior seals of this type but which operates without loss of efficiency. Another object of this invention is to provide a secondary seal which is capable of more reliable operation than conventional grommet-type secondary seals as used in fluid pump seals.

A further object of the present invention is to provide an improved rotary seal for fluid pumps or the like which permits the seal rotor to evenly follow the seal stator. More specifically, in this connection, an object is to provide an improved rotary seal which allows for the "take-up" in the face of axial movement without loss of efficiency.

A more specific object is to provide an improved rotary seal for fluid pumps or the like which utilizes standard O rings in lieu of specially molded grommets.

Another more specific object of the present invention is to provide an improved rotary seal having few parts of simple design which may be easily assembled, disassembled, installed and serviced.

Other objects and advantages of the invention will become apparent upon reading the following detailed description and upon reference to the drawings, in which:

FIGURE 1 is a longitudinal section of a shaft assembly including a rotary seal embodying the present invention; and FIGURE 2 is an elevation taken approximately along the line 2—2 in FIG. 1.

While the invention has been described in connection with a certain preferred embodiment, it is to be understood that the invention is not to be limited to the disclosed embodiment but, on the contrary, the invention is intended to cover the various modifications and equivalent arrangements included within the spirit and scope of the appended claim.

Referring now to FIG. 1, there is shown a rotatable shaft 10 extending through an opening in a pressure enclosing housing 11. A seal 12 embodying the invention is provided for sealing the shaft to the housing so that liquids or gases under pressure cannot escape from the housing along the rotatable shaft.

The stator or nonrotating portion of the seal comprises an annular stator ring 13 which surrounds the shaft 10 and has a radial sealing face 14. The stator is fixed and sealed to the housing 11 by an interposed resilient sealing ring or grommet 15 formed of neoprene or the like. Mounted for rotation with the shaft 10 is a rotor ring 16 which has a radial sealing face 17. The sealing face 14 of the stator and the sealing face 17 of the rotor are each accurately formed by a lapping process to be smooth and flat so that urging the rotor face 17 against the stator face 14 produces a type of positive face seal well known in the art.

The rotor 16 is preferably formed of carbon and the stator 13 is preferably formed of a ceramic material although the choice of materials may vary depending upon the operating conditions, including the nature and temperature of the contained fluid.

In accordance with the present invention, the rotor 16 is secured and sealed to the shaft 10 by an annular resilient sealing member in the form of an O ring 20 which is wedged against both the rotor and the shaft by an annular cup member or ferrule 21 having an angled portion 21a. In its illustrated form, the portion 21a is substantially conical, although a spherical or other equivalent shape would accomplish the same purpose. The O ring has a circular cross-section and is formed of a resilient material such as neoprene with an internal diameter permitting it to be slid onto the shaft 10 so that it is in snug engagement therewith. The cup-like ferrule 21 loosely surrounds the rotor 16 and defines an annular opening between the rotor and the angled ferrule portion 21a within which the O ring 20 is disposed. To lock the rotor 16 and the ferrule 21 together, the ferrule extends axially past a pair of flanges or radial projections 22 and 23 provided on the rotor 16 (see FIG. 2). A pair of radial, rectangular slots 22a and 23a are provided in the rim of the ferrule 21 which receive the radial rotor projections so as to key the rotor to the ferrule.

For holding the sealing elements in engagement, a compressed, helical spring 25 exerts pressure on the ferrule 21 so as to urge it toward the left in FIG. 1. Thus, the ferrule portion 21a bears against the O ring 20, wedging it against the shaft 10 and the rotor 16, and urging the rotor sealing face 17 against the stator face 14. The spring 25 is fitted between a flange or lip 26 on the ferrule 21 and an annular cap or seating member 27 that abuts a shoulder 28 on the shaft 10. It is apparent that the shoulder 28 can be located at any convenient point along the shaft, making it necessary only to provide a spring 25 of suitable length. Moreover, in lieu of coil springs, springs of other types and forms can be utilized to fit within the space limitations of a particular shaft assembly.

A number of factors combine to drive the rotor 16 so as to minimize the loading of the O ring 20. The engagement between the O ring, the shaft 10 and the rotor tends to drive the rotor. In addition, the rotor is keyed to the ferrule 21 and the ferrule tends to be locked to the shaft 10 by the reaction force on the O ring and the effect of the spring 25. Thus, the force with which the O ring is wedged against the rotor 16 and the shaft 10 can be minimized and, as a result, the O ring, rotor and ferrule assembly can shift axially quite freely, the O ring rolling on the shaft, so as to maintain proper sealing engagement between the rubbing faces 14, 17.

Also, the radial slots in the case 21 are larger, in the axial shaft direction, than the radial rotor projections so that, in the event the flange engaging portion of the springs is not disposed perpendicular to the axis, i.e. the spring is out of "squareness," the case 21 will "cock" slightly. However, substantially the same even force will be exerted on the O ring 20. This looseness between the rotor 16 and the ferrule 21 also allows the rotor to "float" slightly with respect to the shaft 10 so that the faces 14, 17 remain in good flat sealing engagement even if the axis of the shaft 10 "wobbles."

Those familiar with this art will appreciate that the seal 12 is particularly economical to manufacture. The O ring 20 is, of course, a standard readily available part, as is the spring 25. The ferrule 21 can be economically stamped or drawn from sheet material. As pointed out above, assembly is not difficult.

In assembling the rotor assembly, one of the radial rotor projections 22 and 23 is inserted into one of the rectangular slots 22a and 23a. The rotor 16 is then moved eccentrically until the other rotor projection is free to move within the ferrule 21 and the other projection is then slipped into the other slot. The rotor is then moved to a concentric position with respect to the ferrule and the spring 25 is positioned over the outside of the ferrule so as to be in engagement with the radial ferrule flange 26. Under these conditions, the rotor is maintained in the concentric position by the spring (see FIG. 1). The spring seat 27 may then be positioned adjacent the end of the spring and the O ring 20 may be disposed in the annular opening between the rotor and the case. At this time, the rotor assembly is ready to be positioned on the shaft 10, as illustrated.

We claim as our invention:

In a rotary seal assembly, the combination which comprises, a stationary annular stator surrounding a rotatable shaft, an annular rotor surrounding the rotatable shaft and having a pair of radial projections, the stator and the rotor having flat radial sealing surfaces in engagement with one another, an annular cup member adapted to surround the shaft and adapted to surround the rotor so as to define an annular opening therebetween, the annular cup having a pair of axial slots for receiving the radial rotor projections so that the rotor is caused to rotate with the cup member, the spacing between said slots permitting said rotor to be tilted and the rotor projections fitted in the slots, an O ring disposed in the opening between the rotor and the cup member, and a spring for urging the rotor and the cup member toward the stator and for securing the O ring between the rotor and the shaft so that a secondary seal is provided and the cup member is caused to rotate with the shaft, said spring having a portion surrounding said slots to preclude displacement of said rotor projections.

References Cited by the Examiner

UNITED STATES PATENTS

| 1,926,006 | 9/1933 | Kohler | 277—93 |
| 2,108,760 | 2/1938 | Weiher | 277—12 |
| 2,403,298 | 7/1946 | Payne | 277—86 |
| 2,995,391 | 8/1961 | Snyder | 277—93 X |

OTHER REFERENCES

Type CW Cartriseal by Cartriseal Corp., Lincolnwood, Ill. Copyrighted 1962 (4 pages).

SAMUEL ROTHBERG, *Primary Examiner.*